US012020688B1

(12) United States Patent
Pan et al.

(10) Patent No.: US 12,020,688 B1
(45) Date of Patent: Jun. 25, 2024

(54) EVALUATION METHOD AND DEVICE OF AIR TRAFFIC CONTROL SPEECH RECOGNITION SYSTEM

(71) Applicant: CIVIL AVIATION FLIGHT UNIVERSITY OF CHINA, Guanghan (CN)

(72) Inventors: Weijun Pan, Guanghan (CN); Peiyuan Jiang, Guanghan (CN); Qinghai Zuo, Guanghan (CN); Xuan Wang, Guanghan (CN); Rundong Wang, Guanghan (CN); Tian Luan, Guanghan (CN); Zixuan Wang, Guanghan (CN); Jian Zhang, Guanghan (CN); Qianlan Jiang, Guanghan (CN); Yidi Wang, Guanghan (CN)

(73) Assignee: CIVIL AVIATION FLIGHT UNIVERSITY OF CHINA, Guanghan (CN)

( * ) Notice: Subject to any disclaimer, the term of this patent is extended or adjusted under 35 U.S.C. 154(b) by 0 days.

(21) Appl. No.: 18/395,770

(22) Filed: Dec. 26, 2023

(30) Foreign Application Priority Data

Dec. 28, 2022 (CN) .......................... 202211687813.3

(51) Int. Cl.
*G10L 15/01* (2013.01)
*G10L 15/02* (2006.01)
*G08G 5/00* (2006.01)

(52) U.S. Cl.
CPC .............. *G10L 15/01* (2013.01); *G10L 15/02* (2013.01); *G08G 5/0013* (2013.01)

(58) Field of Classification Search
CPC ........ G10L 15/01; G10L 15/02; G08G 5/0013
See application file for complete search history.

(56) References Cited

FOREIGN PATENT DOCUMENTS

CN          113256186 A  *  8/2021

OTHER PUBLICATIONS

Machine English language translation of CN 113256186-A (Year: 2021).*

(Continued)

*Primary Examiner* — Michelle M Koeth
(74) *Attorney, Agent, or Firm* — Zhigang Ma (57) ABSTRACT

An evaluation method and system of an air traffic control (ATC) speech recognition system are provided, the method includes: S1, obtaining, grading and inputting ATC speech data; S2, constructing an evaluation index system; S3, determining weights of utility layer indexes and support layer indexes under different levels ATC speech data; S4, calculating a utility layer score and a support layer score, and adding the scores of the utility layer and the support layer to obtain comprehensive scores of the utility layer and the support layer; S5, determining, weights of the utility layer and the support layer; S6, adding a product of the utility layer weight with the utility layer comprehensive score and a product of the support layer weight with the support layer comprehensive score to obtain a comprehensive score of the speech recognition system; and S7, determining a level of the recognition performance of the speech recognition system.

7 Claims, 3 Drawing Sheets

(56) References Cited

OTHER PUBLICATIONS

Wang et al., "Research on Cognitive APP Evaluation of Visually Impaired Users," 2020 International Conference on Computer Network, Electronic and Automation (ICCNEA), Xi'an, China, 2020, pp. 133-137, doi: 10.1109/ICCNEA50255.2020.00036 (Year: 2020).*

Civil Aviation Flight University of China (Applicant), Claims for CN202211687813.3 (allowed), Dec. 28, 2022.

CNIPA, Notification to grant patent right for invention in CN202211687813.3, dated Feb. 14, 2023.

* cited by examiner

T1: A time to operate without failures

T2: A time taken from a start of malfunction to a start of maintenance

T3: A time of maintenance

EVALUATION METHOD AND DEVICE OF AIR TRAFFIC CONTROL SPEECH RECOGNITION SYSTEM

TECHNICAL FIELD

The disclosure relates to the field of speech recognition, and more particularly to an evaluation method and system of an air traffic control (ATC) speech recognition system.

BACKGROUND

In recent years, with a continuous development of an aviation industry, a number of flights is also increasing year by year, which poses a more severe challenge to keep air traffic smooth and ensure flight safety. Communication and coordination between air traffic controllers and the controller sending a control instruction to crew are main means to adjust flight conflict, promote smooth air traffic, and ensure flight safety. Therefore, it is of great significance to correctly understand air traffic control (ATC) speech to ensure flight safety.

A speech recognition system can convert speech information to text information, thus increasing an information acquisition dimension to prevent an incorrect understanding for information between the controllers and between the controller and the crew, relieving workload of the controller, and ensuring the flight safety. An ATC instruction is a language with professional characteristics, main features of the ATC instruction include fast speech speed, concise and fixed instruction structure and special pronunciation. In the current stage, a quality of the speech recognition system is uneven, different speech recognition systems consider different emphasizes, such as response time, accuracy and other indexes, which makes performance and a recognition effect of the speech recognition system have a big difference, and there is a lack of a method for evaluating the quality of the speech recognition system to quantitatively evaluate the speech recognition system uniformly.

In a field of speech recognition, current evaluation methods are mainly aimed at voice quality and recognition algorithm, an evaluation method for the speech recognition system has not proposed yet. Based on a particularity of an ATC field, it is necessary to propose an evaluation method of an ATC speech recognition system in the ATC field based on traditional system evaluation methods, to overcome a problem of unified quantitative evaluation of the speech recognition systems in the ATC field.

SUMMARY

A purpose of the disclosure is to overcome a problem of unified quantitative evaluation of a speech recognition system in the related art, and provide an evaluation method and system of an air traffic control (ATC) speech recognition system.

In order to achieve the above purpose, the disclosure provides the following technical solutions.

An evaluation method of an ATC speech recognition system is provided, and the evaluation method includes:

S1, obtaining ATC speech data; grading, based on a quality level of the ATC speech data, the ATC speech data to obtain speech data with different quality levels, and inputting the speech data with different quality levels into a to-be-evaluated ATC speech recognition system;

S2, constructing an evaluation index system; where indexes of the evaluation index system include utility layer indexes and support layer indexes;

S3, determining, by using an improved group-G2 method and an improved criteria importance through intercriteria correlation (CRITIC) method, weights of the utility layer indexes and weights of the support layer indexes under the ATC speech data with different quality levels;

S4, calculating, according to the weights of the utility layer indexes and the weights of the support layer indexes under the ATC speech data with different quality levels, scores of a utility layer and scores of a support layer under the ATC speech data with different quality levels by using an improved technique for order preference by similarity to ideal solution (TOPSIS) method; and adding the scores of the utility layer to obtain a comprehensive score of the utility layer and adding the scores of the support layer to obtain a comprehensive score of the support layer;

where the TOPSIS method is to determine $Z^+$ and $Z^-$ of an index through a statistical method, to thereby score a recognition performance of the to-be-evaluated ATC speech recognition system; and where $Z^+$ represents a set containing optical values of evaluation indexes of the to-be-evaluated ATC speech recognition system, and $Z^-$ represents a set containing worst values of the evaluation indexes of the to-be-evaluated ATC speech recognition system;

S5, determining, according to the comprehensive score of the utility layer and the comprehensive score of the support layer, a weight of the utility layer and a weight of the support layer of the to-be-evaluated ATC speech recognition system by using the improved group-G2 method and the improved CRITIC method;

S6, multiplying the weight of the utility layer and the comprehensive score of the utility layer to obtain a first product, multiplying the weight of the support layer and the comprehensive score of the support layer to obtain a second product, and adding the first product and the second product to obtain a comprehensive score of the to-be-evaluated ATC speech recognition system; and S7, determining, according to the comprehensive score of the to-be-evaluated ATC speech recognition system, a level of the recognition performance of the to-be-evaluated ATC speech recognition system.

In an exemplary embodiment, the evaluation method of the ATC speech recognition system further includes: comparing the level of the recognition performance of the to-be-evaluated ATC speech recognition system with levels of the recognition performance of other ATC speech recognition systems individually, thereby to obtain a target ATC speech recognition system, and applying the target ATC speech recognition system to recognize an ATC instruction, to thereby make an air traffic controller or a crew member correctly understand the ATC instruction.

In an embodiment, in step S2, the utility layer indexes include accuracy indexes and a recognition rate index, the recognition rate index includes a processing time consumption, and the processing time consumption refers to a time consumed from a moment when the to-be-evaluated ATC speech recognition system receives completely inputted ATC speech data to a moment when the to-be-evaluated ATC speech recognition system recognizes a result and outputs the result.

In an embodiment, the accuracy indexes include a sentence accuracy, a word accuracy and a keyword accuracy, and a calculation expression of the keyword accuracy is expressed as follows:

$$K_{acc} = 1 - \left(\frac{K_{error}}{K_{total}} \times 100\%\right);$$

where $K_{acc}$ represents the keyword accuracy, $K_{error}$ represents a number of keyword errors in a sentence, and $K_{total}$ represents a total number of keywords in a sentence.

In an embodiment, in step S2, the support layer indexes include reliability indexes and maintainability indexes.

In an embodiment, in step S4, calculation formulas of $Z^+$ and $Z^-$ of the index in the improved TOPSIS method are as follows:

$$Z^+ = (\max\{z_{11}, z_{21}, \ldots, z_{n1}\}, \max\{z_{12}, z_{22}, \ldots, z_{n2}\}, \ldots \max\{z_{1n}, z_{2n}, \ldots, z_{nn}\});$$

$$Z^- = (\min\{z_{11}, z_{21}, \ldots, z_{n1}\}, \min\{z_{12}, z_{22}, \ldots, z_{n2}\}, \ldots \min\{z_{1n}, z_{2n}, \ldots, z_{nn}\});$$

where $z_{11}$ represents a first index value of a first system, $z_{21}$ represents a first index value of a second system, $z_{22}$ represents a second index value of a second system, $z_{2n}$ represents a n-th index value of the second system, and $z_{nn}$ represents a n-th index value of a n-th system.

In an embodiment, in step S7, the determining, according to the comprehensive score of the to-be-evaluated ATC speech recognition system, a level of the recognition performance of the to-be-evaluated ATC speech recognition system includes: determining, according to the comprehensive score of the to-be-evaluated ATC speech recognition system and a determination principle, the level of the recognition performance of the to-be-evaluated ATC speech recognition system; and the determination principle includes:

determining, in response to the comprehensive score being in a range of 0.0-0.3 scores, containing 0.3 scores, the level of the recognition performance to be level 1;

determining, in response to the comprehensive score being in a range of 0.3-0.5 scores, containing 0.5 scores, the level of the recognition performance to be level 2;

determining, in response to the comprehensive score being in a range of 0.5-0.7 scores, containing 0.7 scores, the level of the recognition performance to be level 3;

determining, in response to the comprehensive score being in a range of 0.7-0.9 scores, containing 0.9 scores, the level of the recognition performance to be level 4; and determining, in response to the comprehensive score being in a range of 0.9-1.0 scores, containing 1.0 score, the level of the recognition performance to be level 5.

An evaluation system of the ATC speech recognition system is provided, the evaluation system includes at least one processor and a memory communicatively connected to the at least one processor, the memory stores an instruction executed by the at least one processor, and the instruction is configured to be executed by the at least one processor, to make the at least one processor to execute any one steps of the evaluation method.

Compared to the related art, beneficial effects of the disclosure are as follows.

1. The improved TOPSIS method overcomes the problem of unified quantitative evaluation of the speech recognition system in an ATC field, and achieves comprehensive quantification evaluations of single and multiple indexes for the ATC speech recognition system.

2. A method fusing the improved group-G2 method and the improved CRITIC method of the disclosure is used to determine a weight of each index, the method is a specific implementation of subjective weighting combined with objective weighting to ultimately determine the weights of the indexes, and the method overcomes one-sidedness caused by subjective weighting and a deviation caused by objective weighting, and makes an evaluation effect more reliable.

DETAILED DESCRIPTION OF EMBODIMENTS

The disclosure will be described in detail below in conjunction with embodiments and specific implementations. However, it cannot be understood that a scope of the above topics of the disclosure is merely limited to the following embodiments, and all technologies implemented based on a content of the disclosure fall within a scope of the disclosure.

Embodiment

Figure 1:
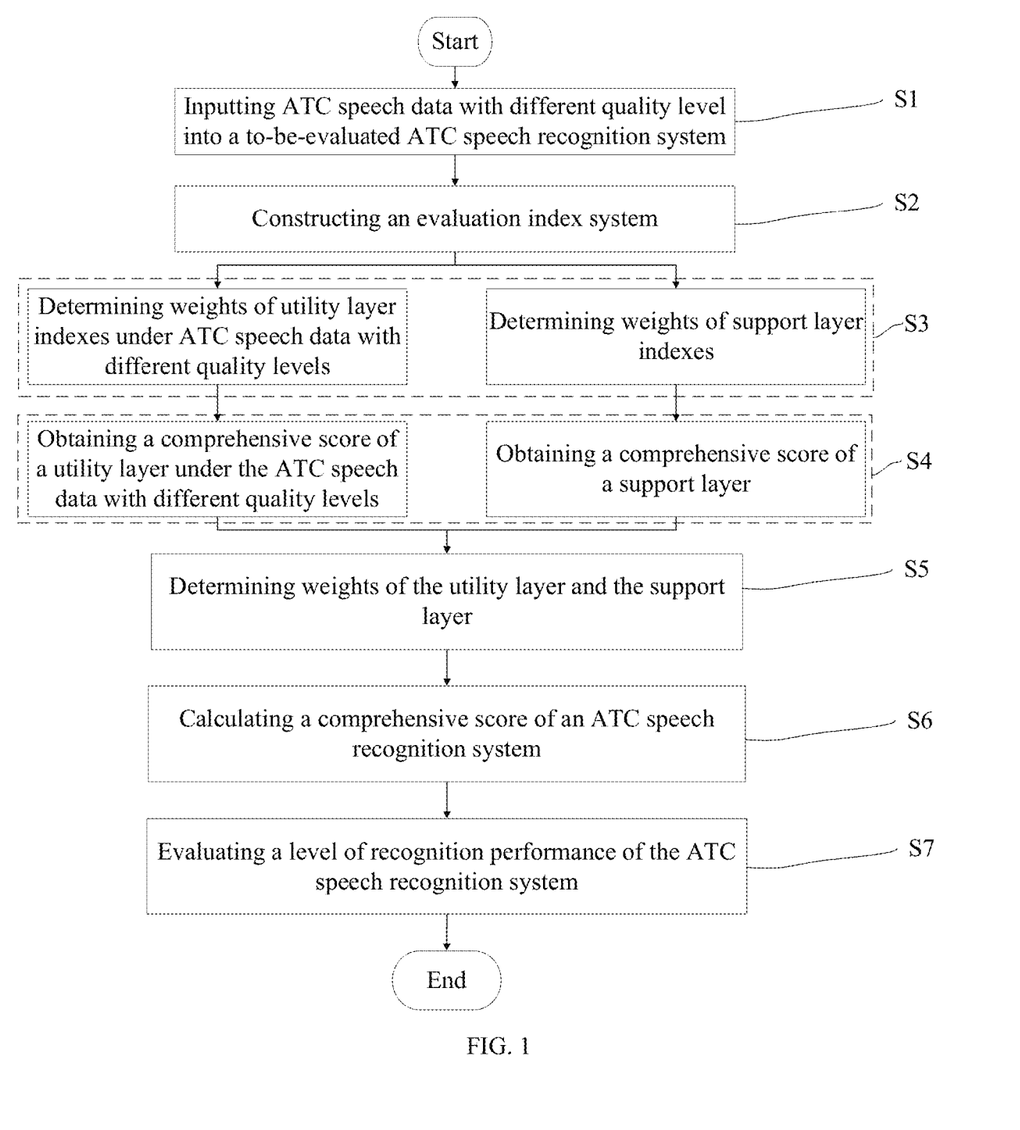
FIG. 1 illustrates a flowchart of an evaluation method of an air traffic control (ATC) speech recognition system according to an embodiment of the disclosure.

As shown in FIG. 1, the embodiment includes the following steps S1-S7.

In step S1, air traffic control (ATC) speech data is obtained, the ATC speech data is graded to obtain ATC speech data with different quality levels, and the ATC speech data with different quality levels is inputted into a to-be-evaluated ATC speech recognition system.

In step S2, an evaluation index system is constructed, and indexes of the evaluation index system include utility layer indexes and support layer indexes.

In step S3, weights of the utility layer indexes and weights of the support layer indexes under the ATC speech data with different quality levels are determined by using an improved group-G2 method and an improved criteria importance through intercriteria correlation (CRITIC) method.

In step S4, scores of a utility layer and scores of a support layer under the ATC speech data with different quality levels are calculated according to the weights of the utility layer indexes and the weights of the support layer indexes under the ATC speech data with different quality levels and by using an improved technique for order preference by similarity to ideal solution (TOPSIS) method, the scores of the utility layer are added to obtain a comprehensive score of the utility layer, and the scores of the support layer are added to obtain a comprehensive score of the support layer. The TOPSIS method is to determine $Z^+$ and $Z^-$ of an index through a statistical method, to thereby score a recognition performance of the to-be-evaluated ATC speech recognition system. $Z^+$ represents a set containing target values of evaluation indexes of the to-be-evaluated ATC speech recognition system, and $Z^-$ represents a set containing worst values of the evaluation indexes of the to-be-evaluated ATC speech recognition system.

In step S5, a weight of the utility layer and a weight of the support layer of the to-be-evaluated ATC speech recognition system are determined according to the comprehensive score of the utility layer and the comprehensive score of the support layer and by using the improved group-G2 method and the improved CRITIC method.

In step S6, the weight of the utility layer and the comprehensive score of the utility layer are multiplied to obtain a first product, the weight of the support layer and the comprehensive score of the support layer are multiplied to obtain a second product, and the first product and the second product are added to obtain a comprehensive score of the to-be-evaluated ATC speech recognition system.

In step S7, a level of the recognition performance of the to-be-evaluated ATC speech recognition system is determined according to the comprehensive score of the to-be-evaluated ATC speech recognition system.

The improved group-G2 method is a subjective weighting method with high flexibility and can largely reflect risk awareness characteristics of experts, and the improved group-G2 method includes the following steps (1)-(4).

In step (1), a weight of a minimum class non empty intersection (i.e., a comprehensive assignment interval of an expert for indexes) is calculated as follows.

1) The minimum class non empty intersection.

$x_i$ represents an evaluation index, $x_m$ represents a least important index recognized by the experts, $a_i^{(k)}$ represents a ratio of importance degree between the index $x_i$ and the index $x_m$ by an expert k. $D_i^{(k)}$ represents an assignment interval of $a_i^{(k)}$, where $d_{1i}^{(k)}$ and $d_{2i}^{(k)}$ are respectively left and right end points of the interval, for the index m, $d_{1m}^{(k)}=d_{2m}^{(k)}=1$ (the least important index is set as 1). Therefore, a minimum class non empty intersection of $D_i^{(k)}$ is set as $D_i^A$, let a set $S=\{1, 2, 3, \ldots, L \text{ (L experts)}\}$, and the minimum class non empty intersection $D_i^A$ should satisfy the following conditions 1-3.

In condition 1, A represents a non-empty subset of S.
In condition 2, $D_i^A = \cap_{k \in A} D_i^{(k)} \neq \emptyset$.
In condition 3, $w \in S$ exists, and $w \notin A$, and all of this satisfy $D_i^A \cap D_i^{(w)} = \emptyset$.

2) Adjacency degree: n is set as a number of the minimum class non empty intersections of an i-th index, $D_i^{Aj}$ is recorded as a j-th minimum class non empty intersection for the i-th index, $x_{x_{ij}}^-$ and $x_{x_{ij}}^+$ are respectively left and right end points of $D_i^{Aj}$, $I_j$ represents an adjacency degree between the j-th minimum class non empty intersection and other minimum class non empty intersections, and calculation formulas of the adjacency degree are expressed as follows:

$$I_j = 1/\sum_{p=1, p \neq j}^{n} \left\| D_i^{Aj} - D_i^{Ap} \right\|;$$

$$\left\| D_i^{Aj} - D_i^{Ap} \right\| = \left[ \left( x_{x_{ij}}^- - x_{ip}^- \right)^2 + \left( x_{x_{ij}}^+ - x_{ip}^+ \right)^2 \right]^{1/2}.$$

3) Capacity: $P_j$ is set as a capacity of $D_i^{Aj}$, that is, $A_j$ represents a number of intervals obtained by how many intervals intersect.

4) A calculation formula of a weight of the minimum class non empty intersection is expressed as follows:

$$v_j = P_j l_j \sum_{i=1}^{n} P_i l_i, j = 1, 2, 3, \ldots, n;$$

where $v_j$ represents a weight of the j-th minimum class non empty intersection.

In step (2), the comprehensive assignment interval of the expert for the index is calculated as follows.

A formula of the comprehensive assignment interval of the group experts on a comprehensive importance of an index is expressed as follows:

$$D_i = \sum_{j=1}^{n} v_j D_i^{Aj}, i = 1, 2, \ldots, m;$$

where n represents a number of the minimum class non-empty intersections, and m represents a number of indexes.

In step (3), a risk attitude factor is determined as follows.

$I_k^*$ represents an adjacency degree between the assignment interval $D_i^{(k)}$ of the ratio of importance degree between the index $x_i$ and the index $x_m$ by the expert and other assignment intervals, and calculation formulas of $I_k^*$ are expressed as follows:

$$I_k^* = 1/\sum_{j=1, j \neq k}^{n} \left\| D_i^{(k)} - D_i^{(j)} \right\|, k = 1, 2, \ldots, L;$$

$$r_k = I_k^* / \sum_{j=1}^{n} I_j^*, k = 1, 2, \ldots, L;$$

where $r_k$ represents a result of normalizing the adjacency degree of the assignment interval of the k-th expert.

A calculation formula of a risk attitude factor $\lambda_i$ is expressed as follows:

$$\lambda_i = \left[ -\sum_{h=1}^{Q_i^L} \frac{LS_i^h}{d_1} r_{Nh} + \sum_{h=1}^{Q_i^R} \frac{RS_i^h}{d_2} r_{Mh} \right]^{\frac{1}{2}};$$

where $r_{Nh}$ represents a normalized adjacency degree of an assignment interval of a Nh-th expert, $r_{Mh}$ represents a normalized adjacency degree of an assignment interval of a Mh-th expert, $r_{Nh}=(1, 2, \ldots, Q_i^L)$ and $r_{Mh}=(1, 2, \ldots Q_i^R)$, which correspond to $r_k(k=1, 2, 3, \ldots, L)$ one-by-one.

Relevant concepts involved in the above formula are as follows.

1) $n(D_i^{(k)})$ represents a middle point of the assignment interval $D_i^{(k)}$; and $Q_i^L$ represents a number of middle points on a left of $n(D_i)$.
2) $n(D_i^{(Nh)})$ represents a h-th middle point on an assignment interval to the left of $n(D_i)$ from left to right.
3) $Q_i^R$ represents a number of middle points on a right of $n(D_i)$, and contains $n(D_i)$; and $Q_i^L + Q_i^R = L$.
4) $n(D_i^{(Mh)})$ represents a h-th middle point on an assignment interval to the right of $n(D_i)$ from left to right, and contains a middle point of the interval $n(D_i)$.
5) $LS_i^h$ represents a distance between $n(D_i^{(Nh)})$ and $n(D_i)$, $RS_i^h$ represents a distance between $n(D_i^{(Mh)})$ and $n(D_i)$, $LS_i^h/d_1$ represents a left deviation distance between $n(D_i^{(Nh)})$ and $n(D_i)$, and $h=1, 2, 3, \ldots, Q_i^L$; $RS_i^h/d_2$ represents a right deviation distance between $n(D_i^{(Mh)})$ and $n(D_i)$; and $d_1 = n(D_i) - n(D_i^{(N1)})$.
6) $n(D_i^{(N1)})$ represents a middle point on the left of $n(D_i)$ and facing away from $n(D_i)$; $d_2 = n(D_i^{(Mh)}) - n(D_i)$, and $h = Q_i^R$; and $n(D_i^{(Mh)})$ represents a middle point on the right of $n(D_i)$ and facing away from $n(D_i)$.

In step (4), a weight of the index is determined as follows.

$f_{\lambda_i}$ is set as an interval mapping function of the group experts for the risk attitude factor $\lambda_i$; and $e(D_i)$ represents a length of the interval $D_i$, and a formula of $f_{\lambda_i}$ is expressed as follows:

$$f_{\lambda_i}(D_i)=n(D_i)+\lambda_i e(D_i).$$

$w_i$ is set as a weight of the i-th index, and a formula of $w_i$ is expressed as follows:

$$w_i = f_{\lambda_i}(D_i) / \sum_{j=1}^{m} f_{\lambda_i}(D_i).$$

The improved CRITIC method is an objective weighting method, an existing entropy weighting method only considers an information entropy value of data, while an existing CRITIC method only considers fluctuation and conflict of data. Therefore, the improved CRITIC method is needed, the improved CRITIC method fully considers the fluctuation, the conflict and the information entropy value of the data, and the improved CRITIC method includes the following steps (1)-(7).

In step (1), an evaluation index matrix is constructed.

In step (2), data is standardized, which mainly makes performance normalized and standardized.

In step (3), a proportion of an i-th object of a j-th index is calculated, and a calculation formula is expressed as follows:

$$P_{ij} = \frac{x_{ij}}{\sum_{i=1}^{m} x_{ij}}.$$

In step (4), an information entropy of the j-th index is calculated, and a calculation formula is expressed as follows:

$$e_j = -\frac{1}{\ln n}\sum_{i=1}^{m} P_{ij}\ln P_{ij}.$$

In step (5), a standard deviation of data is calculated, and calculation formulas are expressed as follows:

$$\bar{x}_j = \frac{1}{m}\sum_{i=1}^{m} x_{ij};$$

$$S_j = \sqrt{\frac{\sum_{i=1}^{m}(x_{ij}-\bar{x}_j)^2}{n-1}}.$$

In step (6), a correlation matrix of the data is calculated, and a calculation formula is expressed as follows:

$$R = \frac{\sum_{j,k=1}^{n}(x_{ij}-\bar{x}_j)(x_{ik}-\bar{x}_k)}{\sqrt{\sum_{j=1}^{n}(x_{ij}-\bar{x}_j)^2 \sum_{k=1}^{n}(x_{ik}-\bar{x}_k)^2}}.$$

In step (7), a weight is calculated, and a calculation formula is expressed as follows:

$$W_j = \frac{(e_j+S_j)\sum_{i=1}^{n}(1-|r_{ij}|)}{\sum_{j=1}^{n}(e_j+S_j)\sum_{i=1}^{n}(1-|r_{ij}|)};$$

where $r_{ij}$ represents a correlation coefficient of the i-th index and the j-th index.

A fusion formula of a subjective weight and an objective weight is expressed as follows:

$$W_k = \frac{w_{ok}w_{sk}}{\sum_{k=1}^{m} w_{ok}w_{sk}};$$

where $w_{ok}$ represents an objective weight of an index k, and $w_{sk}$ represents a subjective weight of the index k.

An introduction of the improved TOPSIS method is as follows.

(1) The TOPSIS method before improving includes the following steps 1) to 2).

In step 1), normalizations of the indexes are as follows.

In the utility layer, accuracy indexes are extremely large indexes, a processing time consumption index is an extremely small index, and it is necessary to convert the processing time consumption index to an extremely large index. In the support layer, a maintainability exponent, a mean time between failures (MTBF) and a mean time to failure (MTTF) are extremely large indexes, and a module coupling degree and a mean time to repair (MTTR) are extremely small indexes, and it is necessary to convert the module coupling degree and the mean time to repair to extremely large indexes.

In step 2), standardization of the data is as follows.

In order to eliminate effects of dimensions of different indexes, it is necessary to normalize and standardize the index data matrix, thus obtaining a usable evaluation index matrix, a score of each evaluation object is calculated according to a scoring formula, and the score is calculated based on the following distance formula:

$$\text{score of } x = \frac{\text{distance between } x \text{ and minimum}}{\text{distance between } x \text{ and maximum} + \text{distance between } x \text{ and minimum}}.$$

Specifically, a maximum and a minimum of an index are found and recorded as $Z_j^+$ and $Z_j^-$, and a distance formula of a j-th index of an i-th evaluation object and the maximum is expressed as follows:

$$D_i^+ = \sqrt{\sum_{j=1}^{m} w_j(Z_j^+ - z_{ij})^2};$$

where $Z_j^+$ represents a maximum of the j-th index, and $z_{ij}$ represents a j-th normalized and standardized index value of the i-th evaluation object.

Similarly, a distance formula of the j-th index of the i-th evaluation object and the minimum is expressed as follows:

$$D_i^- = \sqrt{\sum_{j=1}^{m} w_j(Z_j^- - z_{ij})^2};$$

where $w_j$ represents a weight of the index j; and a score $S_i$ of the i-th evaluation object is calculated as follows:

$$S_i = \frac{D_i^-}{D_i^+ + D_i^-}.$$

(2) The improved TOPSIS method includes the following steps 1) to 3).

In step 1), indexes are normalized.

In step 2), data is standardized.

In step 3), a score is calculated.

Formulas proposed in the TOPSIS method before improving is only applicable when there are multiple objects to be evaluated, calculation results of different batches of evaluation objects may not be comparable due to a lack of unified standards during calculation, and scoring results vary greatly when calculated in different batches for a same system.

In the embodiment, determination formulas of $Z^+$ and $Z^-$ of the index determined by using the improved TOPSIS method and a statistical method are expressed as follows:

$Z^+ = (\max\{z_{11}, z_{21}, \ldots, z_{n1}\}, \max\{z_{12}, z_{22}, \ldots, z_{n2}\}, \ldots \max\{z_{1n}, z_{2n} \ldots, z_{nn}\});$ $Z^- = (\min\{z_{11}, z_{21}, \ldots, z_{n1}\}, \min\{z_{12}, z_{22}, \ldots, z_{n2}\}, \ldots \min\{z_{1n}, z_{2n} \ldots, z_{nn}\});$ For evaluating the speech recognition system, the index value is fixed, $Z^+$ and $Z^-$ of the index are determined by the statistical method, and a recognition performance of each to-be-evaluated objects is scored by using the statistical method, so as to achieve scoring for a single object, and the to-be-evaluated objects of different batches have comparability due to unified standards.

A level of the recognition performance of the speech recognition system is graded according to the comprehensive score of the speech recognition system obtained by the method of the disclosure, which are divided into levels 1-5, and level 5 is the highest level. In response to the comprehensive score being a range of 0.0-0.3 scores, containing 0.3 scores, a level of the recognition performance is level 1; in response to the comprehensive score being a range of 0.3-0.5 scores, containing 0.5 scores, a level of the recognition performance is level 2; in response to the comprehensive score being a range of 0.5-0.7 scores, containing 0.7 scores, a level of the recognition performance is level 3; in response to the comprehensive score being a range of 0.7-0.9 scores, containing 0.9 scores, a level of the recognition performance is level 4; and in response to the comprehensive score being a range of 0.9-1.0 scores, containing 1.0 score, a level of the recognition performance is level 5.

A specific recognition performance of each level is as follows.

When the level of the recognition performance is level 1, the recognition system has a low vocabulary and a slow recognition speed, a recognition result does not meet a standard specification, the recognition system can only effectively recognize specific input audio, robustness of the recognition system is poor, and the recognition performance cannot meet requirements.

When the level of the recognition performance is level 2, the recognition system has a limited vocabulary and a slow recognition speed, a grammar structure of a recognition result deviates significantly from the standard specification, the recognition system is more susceptible to interference from audio, resulting in significant deviations in the recognition result, and requires a high standard for input speech, resulting in a poor overall recognition performance.

When the level of the recognition performance is level 3, a vocabulary of the recognition system meets a basic requirement, a grammar structure of a recognition result basically meets the standard specification, a recognition speed is normal, some insertion and deletion errors occur occasionally, and some words are ambiguous.

When the level of the recognition performance is level 4, a vocabulary of the recognition system has a wide coverage, a grammar structure of a recognition result meets the standard specification, a recognition speed is fast, and some words are ambiguous.

When the level of the recognition performance is level 5, a vocabulary of the recognition system has a wide coverage, a grammar structure of a recognition result meets the standard specification, a recognition speed is fast, and recognition is correct and is not ambiguous.

In an embodiment, in step 1, the obtained ATC speech data is graded to 5 levels according to a mean opinion score (MOS) terminology, and a gradation state is shown in Table 1.

TABLE 1

An evaluation standard for grading the ATC speech data

| Audio level | MOS value | Evaluation standard |
| --- | --- | --- |
| Excellent | 4.0-5.0 | Excellent, listen clearly, low latency, and smooth communication |
| Good | 3.5-4.0 | Second best, listen clearly, low latency, lack of smooth communication, and a bit of noise |
| Medium | 3.0-3.5 | Not bad, unable to listen clearly, a certain delay, and be able to communicate |
| Poor | 1.5-3.0 | Reluctant, cannot listen clearly, large delay, and communication requires multiple repetitions |
| Bad | 0-1.5 | Extremely poor, unintelligible, large delay, and bad communication |

Figure 2:
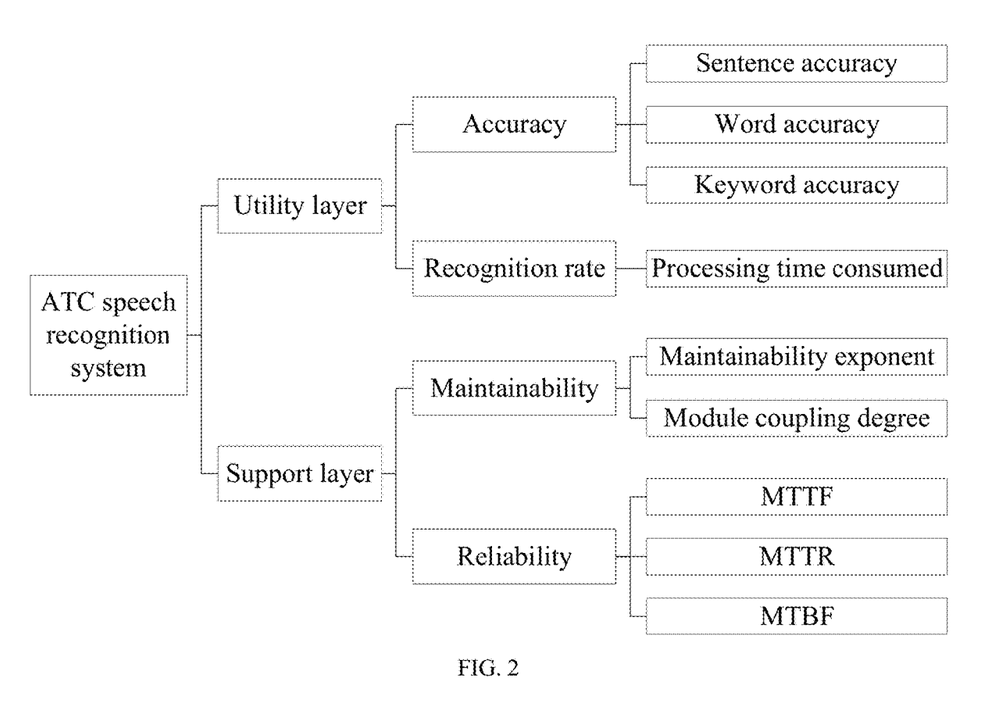
FIG. 2 illustrates a tree diagram of indexes of the evaluation method of the ATC speech recognition system according to an embodiment of the disclosure.

In an embodiment, in step 2, the utility layer indexes include the accuracy indexes and a recognition rate index, the accuracy indexes include a sentence accuracy, a word accuracy and a keyword accuracy, and the utility layer indexes are shown in FIG. 2.

An expression for calculating the sentence accuracy is expressed as follows:

$$S_{acc} = 1 - \left(\frac{E_s}{S_t} \times 100\%\right);$$

where $S_{acc}$ represents the sentence accuracy, $E_s$ represents a number of misrecognized sentences, and $S_t$ represents a total number of recognized sentences.

An expression for calculating the word accuracy is expressed as follows:

$$W_{acc} = \frac{T}{N} \times 100\%;$$

where $W_{acc}$ represents the word accuracy, T represents a number of correctly recognized words, and N represents a total number of words.

An expression for calculating the keyword accuracy is expressed as follows:

$$K_{acc} = 1 - \left(\frac{K_{error}}{K_{total}} \times 100\%\right);$$

where $K_{acc}$ represents the keyword accuracy, $K_{error}$ represents a number of keyword errors in a sentence, and $K_{total}$ represents a total number of keywords in a sentence The recognition rate index includes a processing time consumption, and the processing time consumption refers to a time consumed from a moment when the ATC speech recognition system receives completely inputted ATC speech data to a moment when the ATC speech recognition system recognizes a result and outputs the result.

In an embodiment, in step S2, the support layer indexes include reliability indexes and maintainability indexes.

The reliability indexes include a MTTF, a MTTR and a MTBF.

Figure 3:
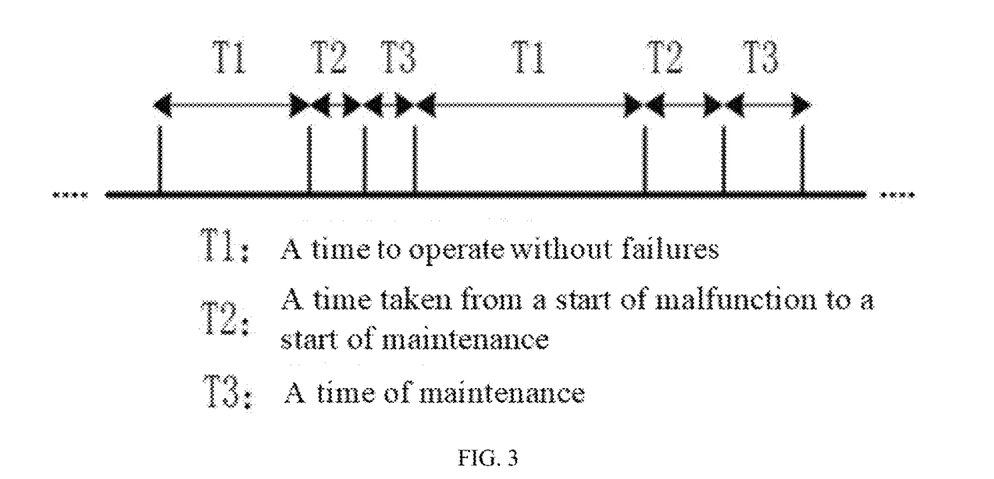
FIG. 3 illustrates a schematic diagram of working times of the ATC speech recognition system according to an embodiment of the disclosure.

As shown in FIG. 3, the MTTF refers to a mean time for the speech recognition system to operate without failures, which is a mean time of time periods between a start of normal operation and an occurrence of a malfunction of the speech recognition system, and a calculation formula is expressed as follows:

$$MTTF = \frac{\sum T_1}{n};$$

where $T_1$ represents a time to operate without failures, and n represents a number of time periods between the start of normal operation and the occurrence of the malfunction of the speech recognition system.

The MTTR refers to a mean time of time periods between the occurrence of the malfunction and an end of maintenance of the speech recognition system, and a calculation formula is expressed as follows:

$$MTTR = \frac{\sum (T_2 + T_3)}{n};$$

where $T_2$ represents a time taken from the start of the malfunction to a start of maintenance, $T_3$ represents a time of maintenance, and n represents a number of time periods between the occurrence of the malfunction and the end of maintenance.

The MTBF refers to a mean time of time periods between two failures of the speech recognition system, and a calculation formula is expressed as follows:

$$MTBF = \frac{\sum (T_2 + T_3 + T_1)}{n};$$

where $T_1$ represents the time to operate without failures, $T_2$ represents the time taken from the start of the malfunction to a start of maintenance, $T_3$ represents the time of maintenance, and n represents a number of time periods between two failures.

The maintainability indexes include a maintainability exponent and a module coupling degree.

A calculation formula of the maintainability exponent is expressed as follows:

$$171 - 5.2 \ln(HV) - 0.23 CC - 16.2 \ln(LOC) + 50 \sin \sqrt{2.46 \times COM};$$

where HV represents a Halstead value, CC represents a cyclomatic complexity, LOC represents an average number of code lines for each module, and COM represents a percentage of comment lines for each module.

A calculation formula of the module coupling degree is expressed as follows:

$$\text{Coupling}(C) = 1 - \frac{1}{d_i + 2c_i + d_o + 2c_o + g_d + 2g_c + r + w};$$

where $d_i$ represents a number of inputted data parameters, $c_i$ represents a number of inputted control parameters, $d_o$ represents a number of outputted data parameters, $c_o$ represents a number of global couplings of outputted control parameters, $g_d$ represents a global variable for storing data, $g_c$ represents a global variable for controlling environmental coupling, w represents a number of fan-out modules called by the module, and r represents a number of fan-in modules calling the modules.

Figure 4:
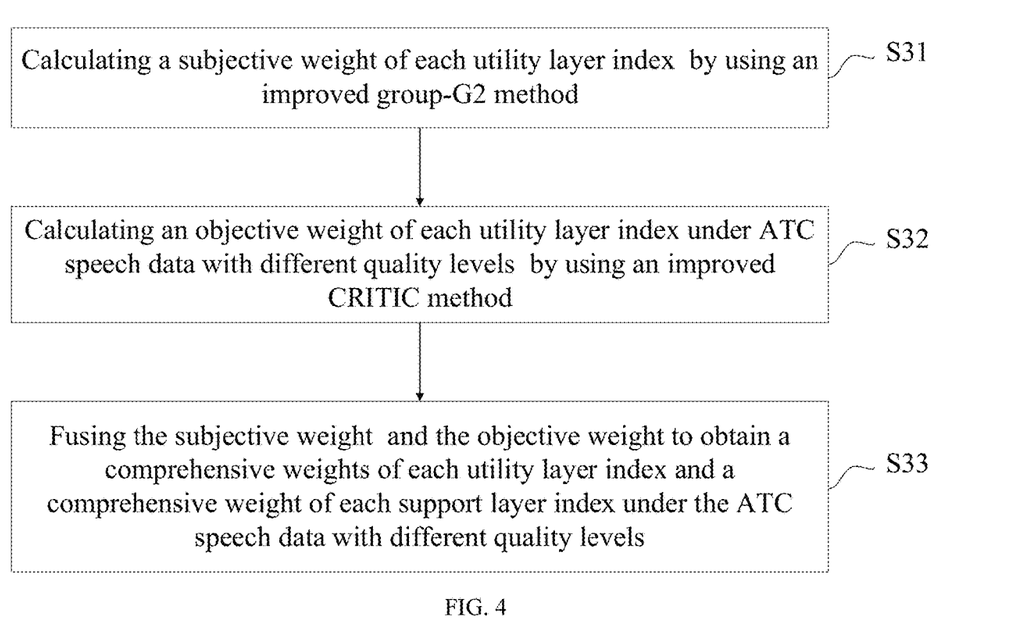
FIG. 4 illustrates a flowchart of determination of weights of utility layer indexes and weights of support layer indexes according to an embodiment of the disclosure.

In an embodiment, in step S3, the weights of the utility layer indexes and the weights of the support layer indexes under the ATC speech data with different quality levels are determined by using the improved group-G2 method and the improved CRITIC method, and step 3 specifically includes the following steps S31-S33.

In step S31, a subjective weight of each utility layer index is calculated by using the improved group-G2 method, the improved group-G2 method is a subjective weighting method for inflecting risk awareness characteristics of the experts, and formulas are expressed as follows:

$$w_i = f_{\lambda_i}(D_i) / \sum_{j=1}^{m} f_{\lambda_i}(D_j);$$

$$f_{\lambda_i}(D_i) = n(D_i) + \lambda_i e(D_i);$$

where $f_{\lambda_i}$ represents the interval mapping function of the group experts for the risk attitude factor $\lambda_i$, $e(D_i)$ represents a length of the interval $D_i$, and $w_i$ represents the subjective weight of the i-th index.

In step S32, an objective weight of each utility layer index under the ATC speech data with different quality levels is calculated by using the improved CRITIC method, the improved CRITIC method is an objective weighting method for the fluctuation, the conflict and the information entropy value of the data, and formulas are expressed as follows:

$$W_j = \frac{(e_j + S_j) \sum_{i=1}^{n}(1 - |r_{ij}|)}{\sum_{j=1}^{n}(e_j + S_j) \sum_{i=1}^{n}(1 - |r_{ij}|)};$$

$$e_j = -\frac{1}{\ln n} \sum_{i=1}^{m} P_{ij} \ln P_{ij};$$

$$S_j = \sqrt{\frac{\sum_{i=1}^{m}(x_{ij} - \bar{x}_j)^2}{n - 1}};$$

-continued $$\bar{x}_j = \frac{1}{m}\sum_{i=1}^{m} x_{ij};$$

$$P_{ij} = \frac{x_{ij}}{\sum_{i=1}^{m} x_{ij}};$$

where $P_{ij}$ represents the proportion of the i-th object of the j-th index, $e_j$ represents the information entropy value of the j-th index, $S_j$ represents a standard deviation of the data, $r_{ij}$ represents a correlation coefficient of the i-th index and the j-th index, and $W_j$ represents an objective weight.

In step S33, the weight obtained by the subjective weighting method (i.e., the improved group-G2 method) and the weight obtained by the objective weighting method (i.e., the improved CRITIC method) are fused to obtain a comprehensive weights of each utility layer index and a comprehensive weight of each support layer index under the ATC speech data with different quality levels, and a formula is expressed as follows:

$$W_k = \frac{w_{ok}w_{sk}}{\sum_{k=1}^{m} w_{ok}w_{sk}};$$

where $w_{ok}$ represents the objective weight of the index k, and $w_{sk}$ represents the subjective weight of the index k.

The evaluation method of the ATC speech recognition system is adopted in the embodiment, four speech recognition systems are actually simulated for instance validation by using a Matlab 2020 software, a system 1, a system 2 and a system 3 are used to calculate weights, and a system 4 is used to final score. Performance of the utility layer indexes and the support layer indexes of each system under the ATC speech data with five quality levels are listed as follows.

The performance of the utility layer indexes of the systems under the ATC speech data with different quality levels is as follows.

TABLE 2

Performance of the utility layer indexes of the systems under level 1 ATC speech data

| | Sentence accuracy | Word accuracy | Keyword accuracy | Processing time consumption (s) |
|---|---|---|---|---|
| System 1 | 85% | 87% | 89% | 1.8 |
| System 2 | 88% | 88.5% | 89.5% | 2 |
| System 3 | 89% | 90% | 90% | 2.1 |
| System 4 | 91% | 91.5% | 92% | 1.8 |

TABLE 3

Performance of the utility layer indexes of the systems under level 2 ATC speech data

| | Sentence accuracy | Word accuracy | Keyword accuracy | Processing time consumption (s) |
|---|---|---|---|---|
| System 1 | 87% | 88% | 90% | 1.6 |
| System 2 | 89% | 89.5% | 91% | 1.8 |
| System 3 | 90% | 91% | 91% | 1.9 |
| System 4 | 92% | 93% | 93% | 1.6 |

TABLE 4

Performance of the utility layer indexes of the systems under level 3 ATC speech data

| | Sentence accuracy | Word accuracy | Keyword accuracy | Processing time consumption (s) |
|---|---|---|---|---|
| System 1 | 89% | 89.5% | 90% | 1.5 |
| System 2 | 90.5% | 91% | 91% | 1.74 |
| System 3 | 91% | 90% | 91.5% | 1.87 |
| System 4 | 94% | 94% | 95% | 1.3 |

TABLE 5

Performance of the utility layer indexes of the systems under level 4 ATC speech data

| | Sentence accuracy | Word accuracy | Keyword accuracy | Processing time consumption (s) |
|---|---|---|---|---|
| System 1 | 92% | 92% | 93% | 1.35 |
| System 2 | 93% | 93% | 94% | 1.45 |
| System 3 | 94% | 94.5% | 95% | 1.55 |
| System 4 | 95% | 95.5% | 96% | 1.2 |

TABLE 6

Performance of the utility layer indexes of the systems under level 5 ATC speech data

| | Sentence accuracy | Word accuracy | Keyword accuracy | Processing time consumption (s) |
|---|---|---|---|---|
| System 1 | 93% | 94% | 94% | 1.3 |
| System 2 | 94% | 94.5% | 95% | 1.5 |
| System 3 | 95% | 96% | 96% | 1.6 |
| System 4 | 97% | 97% | 97% | 1.2 |

Performance of the support layer indexes of the systems is as follows.

TABLE 7

Performance of the support layer indexes of the systems

| | Maintainability exponent | Module coupling degree | MTTF (h) | MTTR (h) | MTBF (h) |
|---|---|---|---|---|---|
| System 1 | 89 | 0.78 | 8000 | 30 | 8030 |
| System 2 | 80 | 0.82 | 8300 | 36 | 8330 |
| System 3 | 75 | 0.95 | 7200 | 401 | 7240 |
| System 4 | 90 | 0.3 | 13000 | 20 | 13020 |

The improved group-G2 method and the improved CRITIC method are combined to calculate the subjective weight and the objective weight of each utility layer index under the ATC speech data with different quality levels, and the subjective weight and the objective weight are fused to obtain the comprehensive weight of each utility layer index under the ATC speech data with different quality levels; and a same method is used to determine the comprehensive weight of each support layer index.

The improved group-G2 method is used to calculate the weight of each utility layer index.

TABLE 8

Weights of the utility layer indexes under 5 levels ATC speech data calculated by using the improved group-G2 method

| Index $x_i$ | Assignment interval $D_i^{(1)}$ of an expert 1 | Assignment interval $D_i^{(2)}$ of an expert 2 | Assignment interval $D_i^{(3)}$ of an expert 3 | Minimum class non empty intersection $D_i^{AJ}$ | Comprehensive assignment interval | Risk attitude factor $\lambda_i$ | Interval mapping function $f_{\lambda_i}$ | Index weight $w_i$ |
|---|---|---|---|---|---|---|---|---|
| Index 1 | [1, 1] | [1, 1] | [1, 1] | [1, 1] | [1, 1] | 0 | 1 | 0.106 |
| Index 2 | [1.5, 2.5] | [2, 3] | [1.5, 3] | [2, 2.5] | [2, 2.5] | 0 | 2.25 | 0.238 |
| Index 3 | [1.5, 2.5] | [1.5, 2.5] | [1.5, 2.5] | [2.5, 3] | [2.5, 3] | −0.6 | 2.45 | 0.259 |
| Index 4 | [1.5, 2.5] | [1.5, 2.5] | [1.5, 2.5] | [3.5, 4] | [3.5, 4] | 0 | 3.75 | 0.397 |

Specifically, the index 1 is the sentence accuracy; the index 2 is the word accuracy; the index 3 is the keyword accuracy; and the index 4 is the processing time consumption.

Similarly, the weights of the utility layer indexes under 4 levels ATC speech data obtained by using the improved group-G2 method are shown in Table 9.

TABLE 9

The weights of the utility layer indexes under the 4 levels ATC speech data obtained by using the improved group-G2 method

| Level of the ATC speech data | Weight of the sentence accuracy | Weight of the word accuracy | Weight of the keyword accuracy | Processing time consumption (s) |
|---|---|---|---|---|
| Level 1 ATC speech data | 0.17 | 0.295 | 0.34 | 0.195 |
| Level 2 ATC speech data | 0.16 | 0.29 | 0.32 | 0.23 |
| Level 3 ATC speech data | 0.14 | 0.26 | 0.3 | 0.3 |
| Level 4 ATC speech data | 0.104 | 0.242 | 0.286 | 0.368 |

TABLE 10

Weights of the support layer indexes calculated by using the improved group-G2 method

| Index $x_i$ | Assignment interval $D_i^{(1)}$ of an expert 1 | Assignment interval $D_i^{(2)}$ of an expert 2 | Assignment interval $D_i^{(3)}$ of an expert 3 | Minimum class non empty intersection $D_i^{AJ}$ | Comprehensive assignment interval | Risk attitude factor $\lambda_i$ | Interval mapping function $f_{\lambda_i}$ | Index weight $w_i$ |
|---|---|---|---|---|---|---|---|---|
| Index 1 | [1, 1] | [1, 1] | [1, 1] | [1, 1] | [1, 1] | 0 | 1 | 0.062 |
| Index 2 | [2, 3] | [2.5, 3] | [2.6, 3.6] | [2.6, 3] | [2.6, 3] | −0.0875 | 2.66 | 0.164 |
| Index 3 | [4, 6] | [3, 6] | [5, 6.5] | [5, 6] | [5, 6] | −0.222 | 5.278 | 0.326 |
| Index 4 | [3, 4] | [3, 4.5] | [2, 3.5] | [3, 3.5] | [3, 3.5] | 0.184 | 3.342 | 0.207 |
| Index 5 | [3,5] | [4, 5.5] | [3,5] | [4, 5] | [4, 5] | −0.6 | 3.9 | 0.2411 |

Weights of the utility layer indexes and the support layer indexes calculated by using the improved CRITIC method are as follows.

The weights of the utility layer indexes under the ATC speech data with different quality levels calculated by using the improved CRITIC method are shown in Table 11-15.

TABLE 11

Weights of the utility layer indexes under the level 1 ATC speech data calculated by using the improved CRITIC method

| | Sentence accuracy | Word accuracy | Keyword accuracy | Processing time consumption (s) |
|---|---|---|---|---|
| Information entropy | 0.6290196609534563 | 05881199233394943 | 0.5881199233394943 | 0.5220605575349556 |
| Information carrying capacity | 0.88142193 | 0.82515617 | 0.82515617 | 2.47773866 |
| Objective weight | 0.26374510 | 0.25014913 | 0.25014913 | 0.23595663 |

The information carrying capacity is obtained by multiplying conflict and volatility of data.

TABLE 12

Weights of the utility layer indexes under the level 2 ATC speech data calculated by using the improved CRITIC method

| | Sentence accuracy | Word accuracy | Keyword accuracy | Processing time consumption (s) |
|---|---|---|---|---|
| Information entropy | 0.6203819994751361 | 0.5881199233394943 | 0.6374906669220128 | 0.5220605575349553 |
| Information carrying capacity | 0.86187345 | 0.87119148 | 1.00596527 | 2.46404423 |
| Objective weight | 0.25637963 | 0.24340510 | 0.26816446 | 0.23205081 |

TABLE 13

Weights of the utility layer indexes under the level 3 ATC speech data calculated by using the improved CRITIC method

| | Sentence accuracy | Word accuracy | Keyword accuracy | Processing time consumption (s) |
|---|---|---|---|---|
| Information entropy | 0.6290196609534563 | 0.5220605575349555 | 0.6203819994751361 | 0.5316247532311797 |
| Information carrying capacity | 1.02890285 | 1.00022968 | 1.04098174 | 2.26830129 |
| Objective weight | 0.27816315 | 0.20498861 | 0.27058092 | 0.24626732 |

TABLE 14

Weights of the utility layer indexes under the level 4 ATC speech data calculated by using the improved CRITIC method

| | Sentence accuracy | Word accuracy | Keyword accuracy | Processing time consumption (s) |
|---|---|---|---|---|
| Information entropy | 0.5881199233394949 | 0.554099538248139 | 0.5881199233394933 | 05881199233394943 |
| Information carrying capacity | 0.81919132 | 0.82463451 | 0.81919132 | 2.44679501 |
| Objective weight | 0.25208077 | 0.24375768 | 0.25208077 | 0.25208077 |

TABLE 15

Weights of the utility layer indexes under the level 5 ATC speech data calculated by using the improved CRITIC method

|  | Sentence accuracy | Word accuracy | Keyword accuracy | Processing time consumption (s) |
| --- | --- | --- | --- | --- |
| Information entropy | 0.5881199233394933 | 0.46676943658628967 | 0.5881199233394943 | 0.5220605575349556 |
| Information carrying capacity | 0.82515617 | 0.83687839 | 0.82515617 | 2.43415730 |
| Objective weight | 0.26240273 | 0.23095275 | 0.26240273 | 0.24424179 |

Weights of the support layer indexes calculated by using the improved CRITIC method is shown in Table 16.

TABLE 16

Weights of the support layer indexes calculated by using the improved CRITIC method

|  | Maintainability exponent | Module coupling degree | MTTF (h) | MTTR (h) | MTBF (h) |
| --- | --- | --- | --- | --- | --- |
| Information entropy | 0.5345474455983533 | 0.6301647186683301 | 0.6270410695481976 | 0.5540995382481381 | 0.6264291625127868 |
| Information carrying capacity | 0.34189017 | 0.15893173 | 0.33769637 | 0.30453009 | 0.34240899 |
| Objective weight | 0.18331129 | 0.21888241 | 0.20460045 | 0.18926360 | 0.20394226 |

Comprehensive weights of the utility layer indexes are calculated as follows.

TABLE 17

Dynamic comprehensive weights of the utility layer indexes under levels 1-5 speech data

|  | Weight of the sentence accuracy | Weight of the word accuracy | Weight of the keyword accuracy | Processing time consumption (s) |
| --- | --- | --- | --- | --- |
| Level 1 speech data | 0.17956724308621672 | 0.2955390047654 | 0.340621225831423 | 0.18427252631686084 |
| Level 2 speech data | 0.16356444213165897 | 0.28145765773482057 | 0.3421657976449812 | 0.21281210248853927 |
| Level 3 speech data | 0.15747565905989744 | 0.2155206467724271 | 0.3282496161954392 | 0.2987540779722362 |
| Level 4 speech data | 0.10483767901836524 | 0.23589460869306872 | 0.2883036173005044 | 0.3709640949880616 |
| Level 5 speech data | 0.11228833302739928 | 0.22190164162571346 | 0.2743648891895888 | 0.3914451361572985 |

TABLE 18

Fixed comprehensive weights of the support layer indexes

| Maintainability exponent | Module coupling degree | MTTF (h) | MTTR (h) | MTBF (h) |
| --- | --- | --- | --- | --- |
| 0.15132828144297342 | 0.06831083432737761 | 0.33574629044719095 | 0.1972079780724709 | 0.24740661570998718 |

An optimal value and a worst value of each index obtained from simulation statistics are substituted into the improved TOPSIS method to calculate scores of the utility layers and the support layers of the system 1, the system 2 and the system 3 under 5 level speech data, and a fixed comprehensive weight of the utility layer and a fixed comprehensive weight of the support layer are calculated by using the improved group-G2 method and the improved CRITIC method.

Optimal values and worst values of the utility layer indexes under level 1 speech data are shown in Table 19.

TABLE 19

Optimal values and worst values of the utility layer indexes under level 1 speech data

|  | Sentence accuracy | Word accuracy | Keyword accuracy | Processing time consumption (s) |
|---|---|---|---|---|
| Optimal value | 96% | 96% | 96% | 0.9 |
| Worst value | 80% | 80% | 80% | 5 |

Optimal values and worst values of the utility layer indexes under level 2 speech data are shown in Table 20.

TABLE 20

Optimal values and worst values of the utility layer indexes under level 2 speech data

|  | Sentence accuracy | Word accuracy | Keyword accuracy | Processing time consumption (s) |
|---|---|---|---|---|
| Optimal value | 97% | 97% | 97% | 0.8 |
| Worst value | 82% | 82% | 82% | 4.5 |

Optimal values and worst values of the utility layer indexes under level 3 speech data are shown in Table 21.

TABLE 21

Optimal values and worst values of the utility layer indexes under level 3 speech data

|  | Sentence accuracy | Word accuracy | Keyword accuracy | Processing time consumption (s) |
|---|---|---|---|---|
| Optimal value | 98% | 98% | 98% | 0.7 |
| Worst value | 83% | 83% | 83% | 4 |

Optimal values and worst values of the utility layer indexes under level 4 speech data are shown in Table 22.

TABLE 22

Optimal values and worst values of the utility layer indexes under level 4 speech data

|  | Sentence accuracy | Word accuracy | Keyword accuracy | Processing time consumption (s) |
|---|---|---|---|---|
| Optimal value | 99% | 99% | 99% | 0.6 |
| Worst value | 85% | 85% | 85% | 3.5 |

Optimal values and worst values of the utility layer indexes under level 5 speech data are shown in Table 23.

TABLE 23

Optimal values and worst values of the utility layer indexes under level 5 speech data

|  | Sentence accuracy | Word accuracy | Keyword accuracy | Processing time consumption (s) |
|---|---|---|---|---|
| Optimal value | 99.5% | 99.5% | 99.5% | 0.5 |
| Worst value | 87% | 87% | 87% | 3 |

TABLE 24

Optimal values and worst values of the support layer indexes

|  | Maintainability exponent | Module coupling degree | MTTF (h) | MTTR (h) | MTBF (h) |
|---|---|---|---|---|---|
| Optimal value | 99 | 0.1 | 15000 | 10 | 15010 |
| Worst value | 60 | 1 | 5000 | 72 | 5072 |

Scores of the utility layers of the systems are as follows.

TABLE 25

Scores of the utility layers

|  | System 1 | System 2 | System 3 |
|---|---|---|---|
| Level 1 speech data | 0.747 | 0.716 | 0.7 |
| Level 2 speech data | 0.757 | 0.717 | 0.695 |
| Level 3 speech data | 0.744 | 0.679 | 0.642 |
| Level 4 speech data | 0.736 | 0.705 | 0.69 |
| Level 5 speech data | 0.678 | 0.6001 | 0.5616 |
| Total score | 3.662 | 3.4171 | 3.2896 |

Scores of the support layers of the systems are as follows.

TABLE 26

Scores of the support layers of the systems

|  | System 1 | System 2 | System 3 |
|---|---|---|---|
| Support layer | 0.43 | 0.396 | 0.312 |

Weights of the utility layer indexes and the support layer indexes of the system 4 obtained by using the improved group-G2 method are as follows.

TABLE 27

Weights of the utility layer indexes and the support layer indexes obtained by using the improved group-G2 method

| Index $x_i$ | Assignment interval $D_i^{(1)}$ of an expert 1 | Assignment interval $D_i^{(2)}$ of an expert 2 | Assignment interval $D_i^{(3)}$ of an expert 3 | Minimum class non empty intersection $D_i^{AJ}$ | Comprehensive assignment interval | Risk attitude factor $\lambda_i$ | Interval mapping function $f_{\lambda_i}$ | Index weight $w_i$ |
|---|---|---|---|---|---|---|---|---|
| Index 1 | [1, 1] | [1, 1] | [1, 1] | [1, 1] | [1, 1] | 0 | 1 | 0.37 |
| Index 2 | [1.5, 2] | [1.4, 1.8] | [1.3, 2.3] | [1.5, 1.8] | [1.5, 1.8] | 0.152 | 1.7 | 0.63 |

Weights of the utility layer indexes and the support layer indexes of the system 4 obtained by using the improved CRITIC method are as follows.

|  | Utility layer | Support layer |
|---|---|---|
| Information entropy | 0.5264316348395962 | 0.6255467860676905 |
| Information carrying capacity | 0.06278809 | 0.06358222 |
| Objective weight | 0.47918135 | 0.52081865 |

Comprehensive weights of the utility layer and the support layer of the system 4 are calculated as follows.

TABLE 29

Comprehensive weights of the utility layer and the support layer

| Utility layer | Support layer |
|---|---|
| 0.6103762499483129 | 0.38962375005168703 |

Optimal values and worst values of the scores of the utility layer indexes and the support layer indexes obtained from simulation statistics are substituted into the improved TOPSIS method to calculate a final score of the system 4.

Optimal values and worst values of the scores of the utility layer and the support layer are as follows.

TABLE 30

Optimal values and worst values of the scores of the utility layer and the support layer

|  | Score of the utility layer | Score of the support layer |
|---|---|---|
| Optimal value | 5 | 1 |
| Worst value | 0 | 0 |

Scores of the utility layer of the system 4 under levels 1-5 speech data are calculated according to the dynamic weights of the utility layer indexes under the speech data with different quality levels.

TABLE 31

Scores of the utility layer of the system 4 under levels 1-5 speech data

|  | Level 1 speech data | Level 2 speech data | Level 3 speech data | Level 4 speech data | Level 5 speech data | Total score |
|---|---|---|---|---|---|---|
| Score | 0.7762 | 0.7801 | 0.8161 | 0.7924 | 0.721 | 3.8858 |

According to the fixed weight of each support layer index, the score of the support layer of the system 4 is calculated as 0.8093. According to the fixed weights of the utility layer and the support layer, the final score of the system 4 is calculated as 0.79. According to the gradation principle of the recognition performance of the speech recognition system, the level of the recognition performance of the to-be-evaluated speech recognition system is determined as level 4.

In an embodiment, an evaluation device of the ATC speech recognition system adopts a Core i7-12700 processor, and a memory adopts a 980 PRO iT solid state disk of Samsung, thus making at least one processor can execute any one steps of the evaluation method.

The above is merely the embodiment of the disclosure, and it is not used to limit the disclosure. Any modification, equivalent substitution and improvement made within a spirit and principle of the disclosure should be included in a scope of protection of the disclosure.

What is claimed is:

1. An evaluation method of an air traffic control (ATC) speech recognition system, comprising:
    S1, obtaining ATC speech data, grading, based on a quality level of the ATC speech data, the ATC speech data to obtain ATC speech data with different quality level, and inputting the ATC speech data with different quality level into a to-be-evaluated ATC speech recognition system;
    S2, constructing an evaluation index system; wherein indexes of the evaluation index system comprise utility layer indexes and support layer indexes;
    S3, determining, by using an improved group-G2 method and an improved criteria importance through intercriteria correlation (CRITIC) method, weights of the utility layer indexes and weights of the support layer indexes under the ATC speech data with different quality levels;
    S4, calculating, according to the weights of the utility layer indexes and the weights of the support layer indexes under the ATC speech data with different quality levels, scores of a utility layer and scores of a support layer under the ATC speech data with different quality levels by using an improved technique for order preference by similarity to ideal solution (TOPSIS) method; and adding the scores of the utility layer to obtain a comprehensive score of the utility layer, and adding the scores of the support layer to obtain a comprehensive score of the support layer;
        wherein the TOPSIS method is to determine $Z^+$ and $Z^-$ of an index through a statistical method, to thereby score a recognition performance of the to-be-evaluated ATC speech recognition system; and wherein Z⁺ represents a set containing optimal values of evaluation indexes of the to-be-evaluated ATC speech recognition system, and Z⁻ represents a set containing worst values of the evaluation indexes of the to-be-evaluated ATC speech recognition system;

S5, determining, according to the comprehensive score of the utility layer and the comprehensive score of the support layer, a weight of the utility layer and a weight of the support layer of the to-be-evaluated ATC speech recognition system by using the improved group-G2 method and the improved CRITIC method;

S6, multiplying the weight of the utility layer and the comprehensive score of the utility layer to obtain a first product, multiplying the weight of the support layer and the comprehensive score of the support layer to obtain a second product, and adding the first product and the second product to obtain a comprehensive score of the to-be-evaluated ATC speech recognition system; and S7, determining, according to the comprehensive score of the to-be-evaluated ATC speech recognition system, a level of the recognition performance of the to-be-evaluated ATC speech recognition system.

2. The evaluation method of the ATC speech recognition system as claimed in claim 1, wherein in step S2, the utility layer indexes comprise accuracy indexes and a recognition rate index, the recognition rate index comprises a processing time consumption, and the processing time consumption refers to a time consumed from a moment when the to-be-evaluated ATC speech recognition system receives completely inputted ATC speech data to a moment when the to-be-evaluated ATC speech recognition system recognizes a result and outputs the result.

3. The evaluation method of the ATC speech recognition system as claimed in claim 2, wherein the accuracy indexes comprise a sentence accuracy, a word accuracy and a keyword accuracy, and a calculation expression of the keyword accuracy is expressed as follows:

$$K_{acc} = 1 - \left(\frac{K_{error}}{K_{total}} \times 100\%\right);$$

wherein $K_{acc}$ represents the keyword accuracy, $K_{error}$ represents a number of keyword errors in a sentence, and $K_{total}$ represents a total number of keywords in a sentence.

4. The evaluation method of the ATC speech recognition system as claimed in claim 1, wherein in step S2, the support layer indexes comprise reliability indexes and maintainability indexes.

5. The evaluation method of the ATC speech recognition system as claimed in claim 1, wherein in step S4, calculation formulas of Z⁺ and Z⁻ of the index in the improved TOPSIS method are as follows:

$$Z^+ = (\max\{z_{11}, z_{21}, \ldots, z_{n1}\}, \max\{z_{12}, z_{22}, \ldots, z_{n2}\}, \ldots \max\{z_{1n}, z_{2n}, \ldots, z_{nn}\});$$

$$Z^- = (\min\{z_{11}, z_{21}, \ldots, z_{n1}\}, \min\{z_{12}, z_{22}, \ldots, z_{n2}\}, \ldots \min\{z_{1n}, z_{2n}, \ldots, z_{nn}\});$$

wherein $z_{11}$ represents a first index value of a first system, $z_{21}$ represents a first index value of a second system, $z_{22}$ represents a second index value of a second system, $z_{2n}$ represents a n-th index value of the second system, and $z_{nn}$ represents a n-th index value of a n-th system.

6. The evaluation method of the ATC speech recognition system as claimed in claim 1, wherein in step S7, the determining, according to the comprehensive score of the to-be-evaluated ATC speech recognition system, a level of the recognition performance of the to-be-evaluated ATC speech recognition system comprises:

determining, in response to the comprehensive score being in a range of 0.0-0.3 scores, containing 0.3 scores, the level of the recognition performance to be level 1;

determining, in response to the comprehensive score being in a range of 0.3-0.5 scores, containing 0.5 scores, the level of the recognition performance to be level 2;

determining, in response to the comprehensive score being in a range of 0.5-0.7 scores, containing 0.7 scores, the level of the recognition performance to be level 3;

determining, in response to the comprehensive score being in a range of 0.7-0.9 scores, containing 0.9 scores, the level of the recognition performance to be level 4; and determining, in response to the comprehensive score being in a range of 0.9-1.0 scores, containing 1.0 score, the level of the recognition performance to be level 5.

7. An evaluation system of the ATC speech recognition system, comprising: at least one processor, and a memory communicatively connected to the at least one processor; wherein the memory stores an instruction executed by the at least one processor, and the instruction is configured to be executed by the at least one processor, to make the at least one processor to execute the evaluation method as claimed in claim 1.

* * * * *